United States Patent [19]

Münzebrock

[11] Patent Number: 5,152,183
[45] Date of Patent: Oct. 6, 1992

[54] MEASUREMENT SYSTEM FOR LOADED LIFTING ROPE

[75] Inventor: Anton Münzebrock, Dortmund, Fed. Rep. of Germany

[73] Assignee: Mannesmann Aktiengesellschaft, Düsseldorf, Fed. Rep. of Germany

[21] Appl. No.: 680,311

[22] Filed: Apr. 4, 1991

[30] Foreign Application Priority Data

Apr. 5, 1990 [DE] Fed. Rep. of Germany ....... 4011260

[51] Int. Cl.$^5$ .............................................. G01L 5/00
[52] U.S. Cl. .................... 73/862.56; 73/158; 73/862.627
[58] Field of Search ........... 73/862.56, 862.39, 862.65, 73/158, 862.38, 862.41, 862.42, 862.43, 862.44, 862.64, 862.67; 177/147

[56] References Cited

U.S. PATENT DOCUMENTS

| 241,099 | 5/1881 | Walden | 73/862.042 |
|---|---|---|---|
| 2,061,863 | 11/1936 | Wells | 73/158 |
| 2,520,923 | 9/1950 | Franzel et al. | 73/862.065 |
| 2,765,654 | 10/1956 | Greer et al. | 73/862.065 X |
| 3,290,931 | 12/1966 | Fowkes et al. | 73/862.064 X |
| 3,463,534 | 8/1969 | Norton | 73/862.056 X |
| 3,827,514 | 8/1974 | Bradley | 73/862.056 X |
| 3,911,737 | 10/1975 | Ormond | 73/862.065 |
| 4,509,377 | 4/1985 | Mentzell et al. | 73/862.056 |
| 4,696,359 | 9/1987 | Glibbery | 73/862.067 X |
| 4,883,531 | 11/1989 | Cole et al. | 73/862.039 X |

FOREIGN PATENT DOCUMENTS

| 265880 | 3/1989 | Fed. Rep. of Germany | 73/158 |
|---|---|---|---|
| 481806 | 10/1975 | U.S.S.R. | 73/158 |

Primary Examiner—Allan N. Shoap
Assistant Examiner—G. Bradley Bennett
Attorney, Agent, or Firm—Horst M. Kasper

[57] ABSTRACT

A measurement device is furnished at a lifting means, in particular at a lifting rope, subjected to a load and used in hoisting machines. A support element (5) is disposed at the hoisting device and is attached with at least two force transducers (1) via in each case a support hinge (4). The free ends (3) of the force transducers (1) are joined to each other via a common hinge (9). The lifting means (10) engages at the hinge (9). The force transducers (1) are connected for transferring the force-proportional measurement signals to a signal processing means (12-15). This provides a measurement device and a measurement method which achieves reliable and relevant measurement values with high precision and accuracy. The measurement device is further capable of capturing and determining the forces present at lifting means, and in particular at lifting rope, including the gravity weight force of the load attached to the lifting means, and of the pendulum angle of the lifting means, as well as furnishing a measurement value transducer for a pendulum balancing control system.

42 Claims, 4 Drawing Sheets

MEASUREMENT SYSTEM FOR LOADED LIFTING ROPE

BACKGROUND OF THE INVENTION

1. Field of the Invention

The invention relates to a measurement device and a measurement method at a lifting means, in particular at lifting rope subjected to load for hoisting machines.

2. Brief Description of the Background of the Invention Including Prior Art

A measurement device for capturing the rope deflection for a loading apparatus, in particular for an automatic loading operation, is known from the German Printed Patent Publication DE-OS 2,115,587. The rope deflection is captured in the motion direction of the loading device and of the crane trolley. The loading device comprises substantially a movable lifting device, which is connected via several lifting ropes with a gripper device for a container. The measurement device is disposed at one rope end at the lifting device and comprises essentially two bows supported like a universal joint suspension on axes offset by 90°. The bows surround the vertical lifting rope with a ring. A deflection entails a pivoting motion of the universal joint axes. The pivoting motion is captured via gear segments by potentiometers. The potentiometers are connected to a signal processing device for determining the rope deflection.

This measurement device appears to be disadvantageous, since the accuracy of the determination of the rope deflection based solely on the linearity deviation of the potentiometers is insufficient for an application with, for example, automatic pendulum balancing control systems.

In addition, measurement devices, operating according to the above described measurement principles, are known within the organization where the inventor is active. These known measurement devices are disposed at a tensioned measurement rope furnished in addition to the lifting ropes. The measurement rope is retained under tension by an idling motor. The structural expenditure for this measurement device is disadvantageously increased by the additional measurement rope in connection with the idling motor.

SUMMARY OF THE INVENTION

1. Purposes of the Invention

It is an object of the present invention to furnish a measurement device, which allows with simple means and at a high precision to obtain reliable and relevant measurement values both for a capturing and a determination of the forces, including the gravity weight force, engaging at the lifting means, in particular at a lifting rope, of the load disposed at the lifting rope, and of the pendulum angle of the lifting means, as well as a measurement transducer for a pendulum balancing control system.

It is a further object of the present invention to furnish a method which allows to precisely monitor the forces engaging at a lifting rope including angle deviations caused by the load.

It is yet a further object of the present invention to provide a system which allows a control and a monitoring of loading operations involving lifting ropes, where a shifting and a canting of loads are to be determined automatically.

These and other objects and advantages of the present invention will become evident from the description which follows.

2. Brief Description of the Invention

The present invention provides a measurement device at a lifting means, in particular at a lifting rope subjected to load for hoisting machines.

A support element is disposed at a lifting frame. A first support hinge is attached to the support element. A first force transducer is attached by the first support hinge to the support element and has a first free end. A second support hinge is attached to the support element. A second force transducer is attached by the second support hinge at the support element and has a second free end. A common hinge joins together the first free end of the first force transducer and the second free end of the second force transducer. A lifting means is connected at the common hinge. A signal processing device is connected to the first force transducer and to the second force transducer for transducing respective force-proportional measurement signals.

The second hinge can be disposed about parallel to the first support hinge. The common hinge can be disposed substantially parallel to the first support hinge and to the second support hinge and can be disposed outside of a plane connecting the first support hinge to the second support hinge on the side of the load position.

A first distance from the first support hinge to an axis v, running vertically through a pivot center point M of the common hinge, can be equal to a distance from the second support hinge to the axis v, running vertically through the pivot center point M of the common hinge. The first distance and the second distance can be selected such that the angles b, enclosed by the vertical axis v, and a respective straight line g running through a respective support hinge and the common hinge, can amount to substantially 30°. The first support hinge of the first force transducer and the second support hinge of the second force transducer can be disposed in a horizontal plane. The first support hinge and the second support hinge can be uniformly distributed on an imaginary circle running concentrically to the axis of the common hinge.

A third force transducer can be hinged at a third support hinge for a total force of three force transducers. The first support hinge of the first force transducer and the second support hinge of the second force transducer can be disposed in the corner points of an imaginary pyramid with an equal-sided triangular base face.

A first connection hinge can be disposed at a first end of a first connection body. The second connection hinge can be disposed at a second end of a second connection body. A common connection body can carry the common hinge. The first force transducer with its first end and the second force transducer with its second end can be disposed remote relative to the support element at the common connection body via the first connection hinge and the second connection hinge. The first connection body can receive the first connection hinge on the side disposed opposite to the first force transducer. The second connection body can receive the second connection hinge on the side disposed opposite to the second force transducer. The first force transducer and the second force transducer can be furnished as tension dynamometer rods with wire strain gauges.

The signal processing means can include an electronic amplifier connected to one of the force transducers for amplifying force-proportional measurement signals. A scanning and holding circuit can be connected to the electronic amplifier for receiving and storing amplified measurement signals and outputting clocked measurement signals. An analog digital converter can be connected to the scanning and holding circuit for transforming the clocked measurement signals into digital signals. A computer unit can be connected to the analog digital converter for determining as desired a pendulum angle, a rope force, and a gravity weight force from the digital measurement signals.

A measurement method, using a measurement device at a lifting means, in particular including a lifting rope, subjected to load for hoisting machines, includes the following steps.

The support hinge is engaged with the first force transducer. The second support hinge is engaged with the second force transducer. A rope force S present at the support element is measured with at least two force transducers. Force-proportional measurement signals in the force transducers are generated and fed to signal processing means. A pendulum angle a of the lifting means, a rope force s, and a gravity weight force f as desired are determined with the signal processing means from the force-proportional measurement signals derived from the force transducers and from a fixed geometric disposition of the force transducers relative to each other.

The signals received from the force transducers can be amplified in the signal processing means. Amplified measurement signals can be intermediately stored in a scanning and holding unit. The amplified and clocked measurement signals can be fed to an analog digital converter. The transmitted measurement signals can be transformed in the analog digital converter into digital signals. The digital measurement signals can be fed to a computer unit for determining the pendulum angle a, the rope force S, and the gravity weight force F as desired.

The measurement device can be employed as a measurement value transducer for a pendulum balancing control system in an automatic crane operation.

At least two force transducers are attached at a support element disposed at a lifting device via, in each case, a support hinge. The free ends of the force transducers are connected to each other via a joint hinge. The lifting means engages at the joint hinge. The force transducers are connected to a signal processing device for transmitting the measurement signals proportional to the force.

The invention furnishes thus a general measurement system for load determination at a lifting rope. The measurement system is characterized in that the rope force, engaging at one hinge and fed to a support element, is measured by at least two force transducers. The pendulum angle of the lifting means as well as, possibly, the rope force and the load force, are determined by a signal derived from force-proportional measurement signals of the force transducers and from the fixed geometrical arrangement of the force transducers relative to each other.

The invention measurement device with the special geometric arrangement and suspension of the force transducers achieves a controlled measuring of the one-dimensional force component of the rope force to be measured. Thereby, the force transducers, preferably formed as tension dynamometer rods with wire strain gauges, are loaded only in their load direction and they achieve accurate measurement values. The use of two measurement transducers allows a determination of the pendulum angle in a plane, which is spanned by straight lines describable by the load subjection direction.

For example, in hoisting machines, the suspended load performs a pendulum motion along an about elliptical path based on the crane motion and based on the hoist trolley motion, said path additionally depending on the rope length. The determination of the position of the rope is possible with an invention measurement device with at least three measurement value transducers. The signal processing device determines in this case the pendulum angle in, for example, hoist trolley motion direction and crane motion direction, respectively. The rotation-symmetrical disposition of the measurement value transducers around the vertical axis, running through the pivoting center point of the lifting rope, has proven to be of an advantage. A limitation of the pendulum angle to be measured to the size of the angle between the straight line of the load subjection direction and the vertical axis assures a loading of the measurement value transducers only in tension direction.

The measurement method achieves a determination of the pendulum angle of the support rope with high precision via the splitting and resolving of the rope force into at least two force components and their measurement, as well as via the evaluation of the geometric arrangement and the ratio of the force components. The accuracy of the pendulum angle determination allows the application of this measurement method and of this measurement device as an angle-furnishing unit for pendulum balancing control systems in automatic crane plants. The arrangement of the signal processing with a computer unit, preferably furnished as a microprocessor, is associated with the advantage that, in addition, the rope force can be determined from the pendulum angle and the force components. The determined rope force can then be used as an input value for overload safety devices of lifting machines. The gravity weight force of a load suspended like a pendulum can be easily determined from a combination of the determined rope force and of the pendulum angle.

Upon lifting of the load, an inclination angle is to be avoided, because the released load performs an uncontrolled pendulum motion, which can lead to an endangerment of persons and structures. The inclined pulling of loads can be recognized and prevented with a measurement device according to the invention, which simultaneously captures the pulling force and the deflection angle.

The measurement method and the measurement device furnish large advantages for an economic and compactly structured apparatus by the selective determination of the pendulum angle, of the rope force, and of the gravity weight force in one single measurement unit, as well as the application possibilities as a measurement value transducer for a pendulum balancing control system.

A load measurement device for lifting gears is known from the German Printed Patent DE-2,639,762 C3 for lifting gears with a tension dynamometer rod disposed in the lifting rope course. However, this teaching does not furnish the possibility for determining the pendulum angle of the lifting rope. In addition, the load indication is falsified in case of an oscillating load.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings, in which are shown several of the various possible embodiments of the present invention.

DESCRIPTION OF INVENTION AND PREFERRED EMBODIMENT

Figure 1:
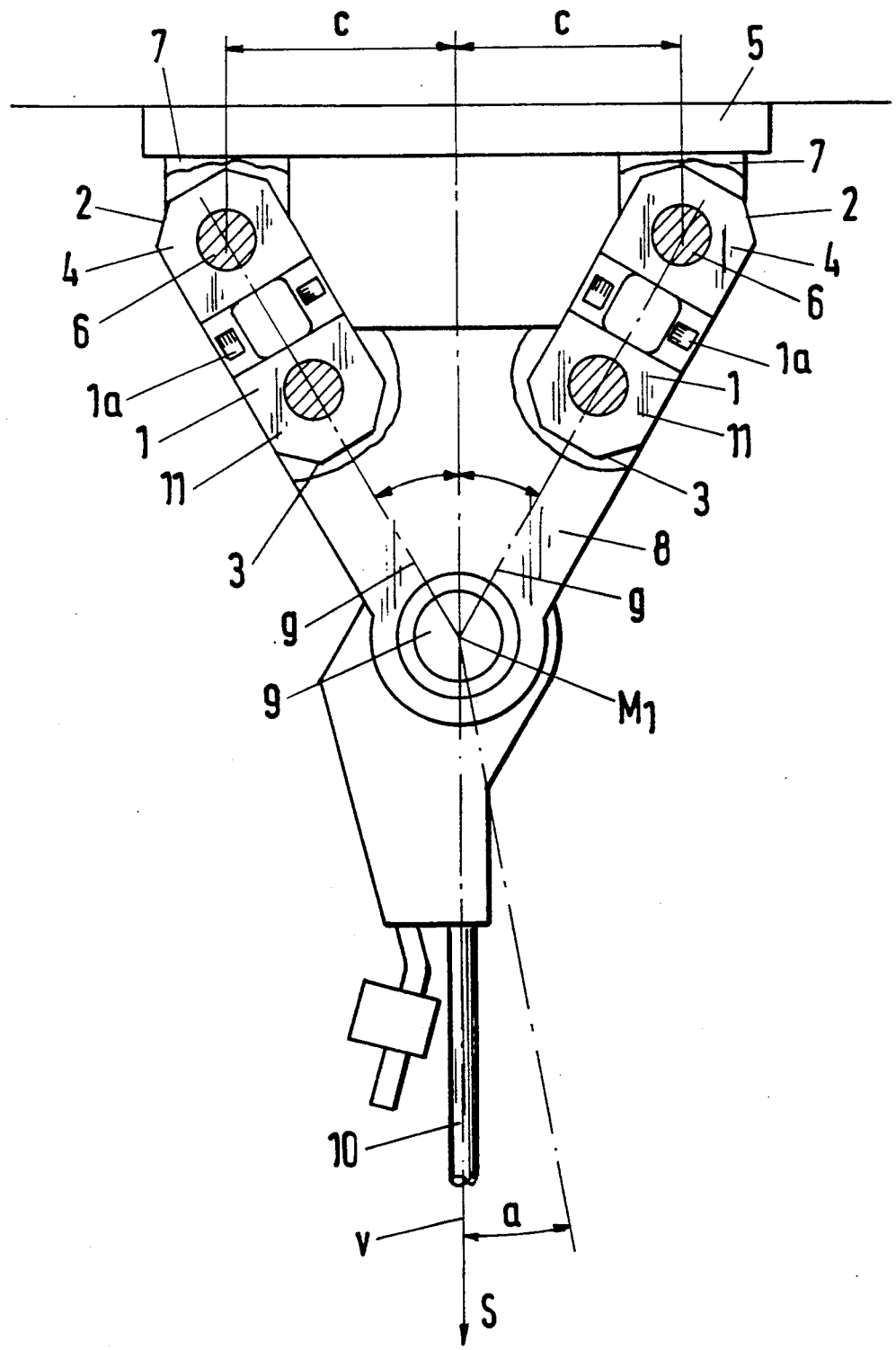
FIG. 1 is a side elevational view of the measurement device with two force transducers.

In accordance with the present invention there is provided a measurement device at a lifting means, in particular including a lifting rope subjected to load for hoisting machines. At least two force transducers 1 are attached via in each case a support hinge 4 at a support element 5 disposed at a lifting device. The free ends 3 of the force transducers 1 are joined together via a common hinge 9. The lifting means 10 connects at the hinge 9. The force transducers 1 are connected to a signal processing device 12-15 for transmission of a force-proportional measurement signal.

The hinge 9 can be disposed in load direction outside of a plane connecting the support hinges 4.

The distances c between the support hinges 4 and an axis v, running vertically through the pivot center point M of the hinge 9, can be equal. The distances c can be selected such that the angles b enclosed by the vertical axis v, and the straight line g, running through the support hinges 4 and the hinge 9, can amount to 30°. The support hinges 4 of the force transducers 1 can be disposed in a horizontal plane and can be uniformly distributed on an imaginary circle running concentrically to the axis v.

Three force transducers 1 can be furnished. The support hinges 4, 9 of the force transducers 1 can be disposed in the corner points of an imaginary pyramid with an equal-sided triangular base face. The force transducers 1 can be disposed with their ends 3 remote relative to the support element 5, at a connection body 8 via connection hinges 11. The connection body 8 can receive the hinges 9 on the side disposed opposite to the force transducer 1. The force transducers 1 can be furnished as tension dynamometer rods with wire strain gauges.

The signal processing means 12-15 can include at least one electronic amplifier 12, amplifying the force-proportional measurement signals, a scanning and holding circuit 13, storing the amplified measurement signals and outputting clocked measurement signals, an analog digital converter 15, transforming the clocked measurement signals, and a computer unit 14. The computer 14 can determine from the digital measurement signals a pendulum angle, as well as possibly a rope force, and a gravity weight force.

A method, using a measurement device at a lifting means, in particular including a lifting rope, subjected to load for hoisting machines includes the following steps.

The rope force S present at a support element 5 and engaging at a support hinge 9 is measured by at least two force transducers 1. A pendulum angle a of the lifting means 10 as well as possibly a rope force S, and a gravity weight force F, are determined by a signal processing means 12-15 from the force-proportional measurement signals of the force transducers 1 and from the fixed geometric disposition of the force transducers 1 relative to each other. The signal processing means 12-15 amplifies the signals received from the force transducers 1. The amplified measurement signals are intermediately stored by a scanning and holding unit 13. The amplified and clocked measurement signals are fed to an analog digital converter 15. The transmitted measurement signals are transformed by the analog digital converter 15. The digital measurement signals are fed to a computer unit 14 for determining the pendulum angle a as well as possibly the rope force S and the gravity weight force F.

The measurement device can be used as a measurement value transducer for a pendulum balancing control system in automatic crane machines.

In accordance with the present invention, FIG. 1 illustrates a measurement device at a lifting rope with two force transducers 1. The force transducers 1 are, in each case, connected with one end 2 to a support element 5 via a support hinge 4. The support element 5 can be a component of a hoist trolley of a crane system, not illustrated. The rope end of a lifting means 10, furnished as a pulley block, engages at the crane system via the measurement device. The support hinges 4 are furnished as bolt connections. In each case, a hinge bolt 6 connects flaps 7 of the support element 5 to the upper end 2 of the force transducers 1, where said upper ends are furnished with the spherically rounded boreholes. The lower ends 3 of the force transducers 1 are jointly disposed at a connection body 8 via additional connection hinges 11 formed as bolt connections. The connection body 8 is connected to the lifting rope 10 via an additional hinge 9 at the end disposed remote relative to the support element 5.

The load subjection direction of the force transducers 1, formed as tension dynamometer rods, can be described by a straight line g. The force measurement value transducers 1 are disposed such that the straight lines g intersect at a pivoting center point M of the hinge 9. In addition, the position of the measurement value transducer 1 can be described by an angle b between the straight lines g and an axis v, running vertically through the pivoting centerpoint M. The pendulum angle a designates the deflection amplitude of the lifting rope 10 measured relative to the vertical axis v.

Figure 2:
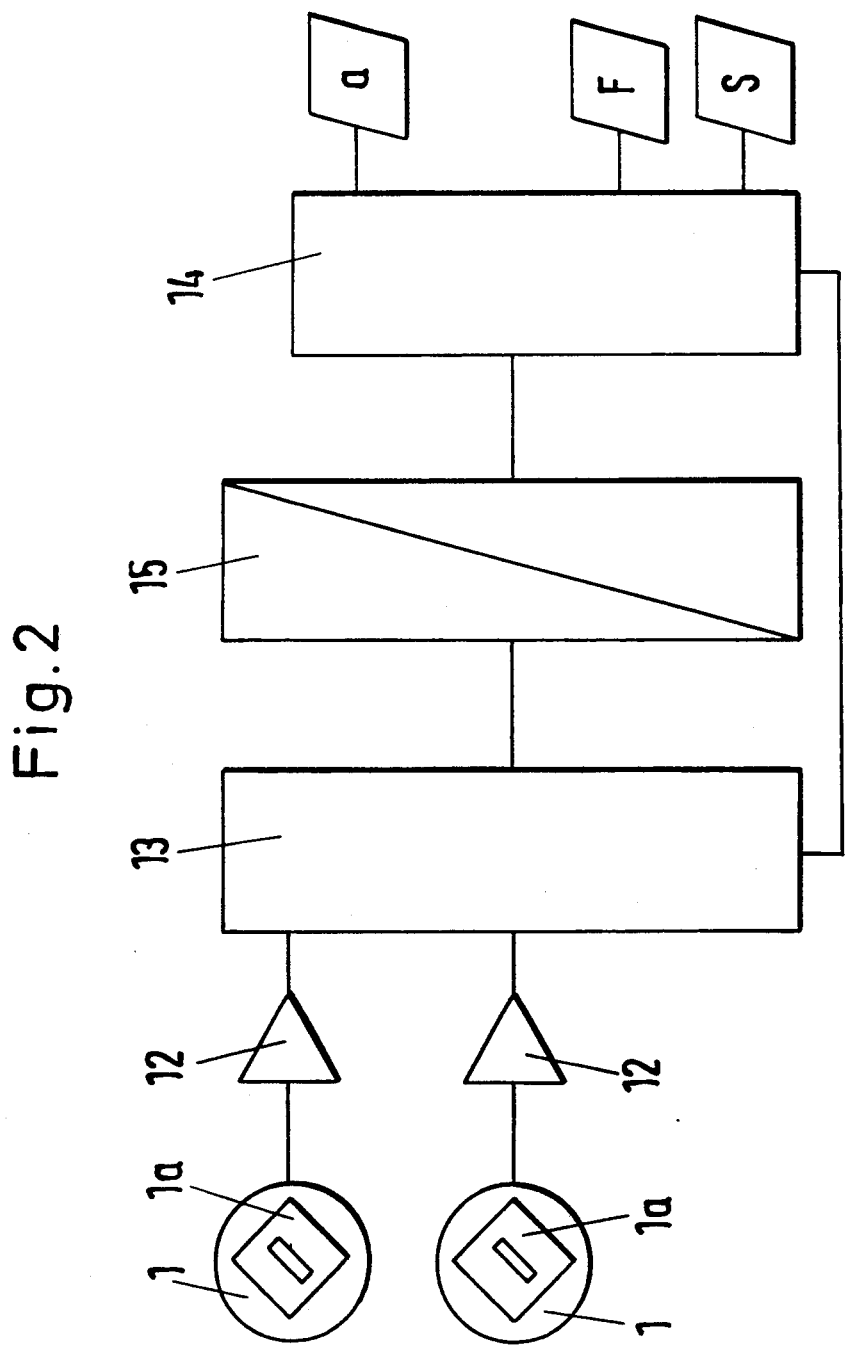
FIG. 2 is a schematic view of a switching circuit arrangement of the signal processing device.

The switching circuit arrangement of the signal processing of the measurement device is illustrated in FIG. 2. The force transducers 1, furnished as tension dynamometer rods, generate a force proportional electric tension in their wire strain gauges 1a. The force-proportional electric tension is amplified by the electronic amplifiers 12 and is fed to a scanning and holding circuit 13. A computer unit 14, furnished as a microprocessor, controls, amongst others, the scanning time and a subsequent serial feeding of the stored tension signals to an upstream analog-digital converter 15. The analog digital converter 15 furnishes a digital value of the measured force signals for the arithmetic processing by the computer unit 14. The computer unit determines the pendulum angle a, the rope force S, and the gravity weight force F based on the generally known laws of technical mechanics. Depending on the application situations, these values can be employed for example, for a display of the load value or as an input value for a pendulum balancing control system.

Figure 3:
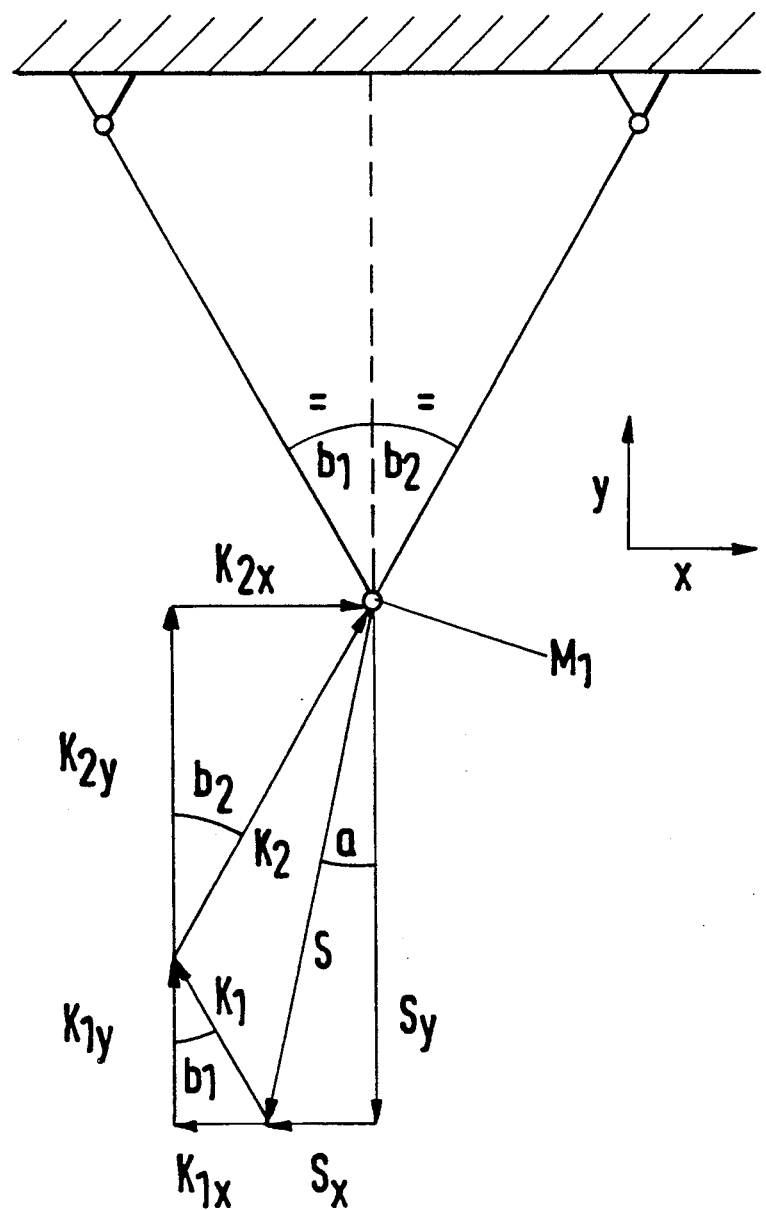
FIG. 3 is a schematic side view of the measurement device including arrows for the forces present.

The course of the calculation and the flow of data performed in the computer unit 14, furnished as a microprocessor, is illustrated by way of FIG. 3. The rope force S is illustrated in a closed triangle of forces with the force components $K_1$ and $K_2$ shifted on their action lines and measured by the force transducers 1. The three forces S, $K_1$ and $K_2$ are additionally represented by their Cartesian force components in x and y direction. The microprocessor calculates the pendulum angle a from the trigonometric connection $$\tan a = \frac{S_x}{S_y}. \tag{1}$$

The force components $S_x$ and $S_y$ can be expressed based on equilibrium consideration, as can be recognized from FIG. 3, by the Cartesian force components $K_{1x}$, $K_{1y}$, $K_{2x}$ and $K_{2y}$ as follows:

$$S_x = K_{2x} - K_{1x} \tag{2}$$

$$S_y = K_{1y} + K_{2y} \tag{3}$$

Again, the Cartesian force components $K_{1x}$, $K_{1y}$, $K_{2x}$ and $K_{2y}$ can be expressed by the measured forces $K_1$ and $K_2$ with the aid of the angles $b_1$ and $b_2$ as follows:

$$K_{1x} = K_1 \sin b_1 \tag{4}$$

$$K_{1y} = K_1 \cos b_1 \tag{5}$$

$$K_{2x} = K_2 \sin b_2 \tag{6}$$

$$K_{2y} = K_2 \cos b_2 \tag{7}$$

If the starting equation (1) is entered into the equations (2)–(7), then a formula is obtained for the determination of the pendulum angle a as follows:

$$\tan a = \frac{K_2 \sin b_2 - K_1 \sin b_1}{K_1 \cos b_1 + K_2 \cos b_2} \tag{8}$$

Based on the assumption that, according to a preferred embodiment of the measurement device, the angles $b_1$ and $b_2$ have the same value, the equation is simplified to the following:

$$\tan a = \frac{(K_2 - K_1) \sin b}{(K_1 + K_2) \cos b} \tag{9}$$

The amount of the rope force S and the weight force F then results from the following formula:

$$S = \sqrt{S_x^2 + S_y^2} \tag{10}$$

$$F = S \cos a \tag{11}$$

Figure 4:
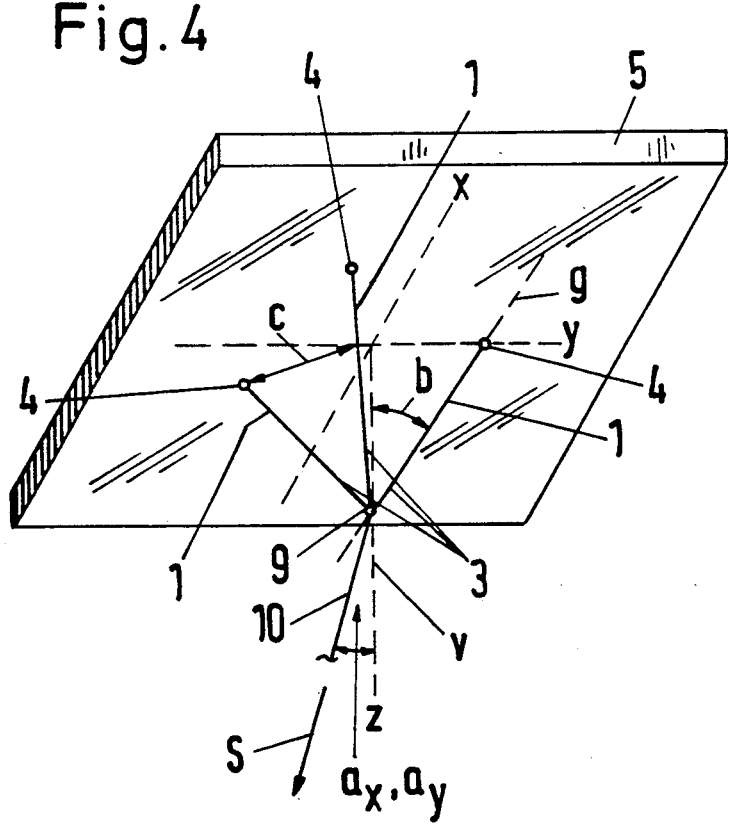
FIG. 4 is a schematic view of the measurement device including three force transducers.

A measurement device with three force transducers 1 is schematically illustrated in FIG. 4. The force transducers 1 are attached at the support element 5 via in each case a support hinge 4. The free ends 3 of the force transducers 1 join in a support hinge 9. For clarification of the directions, there is shown in FIG. 4 an x, y, z coordinate system. In contrast to the x, y coordinate system employed in the preceding figures, in this case, the vertical axis v is illustrated in z direction. For simplification of the schematic representation, only one angle b is illustrated running between a straight line g, which straight line g in turn passes through the support hinges 4 and 9, and the vertical axis v and a distance spacing c between the support hinge 4 and the vertical axis v in the x and y plane. A lifting means 10 engages the support hinge 9 and applies thereby simultaneously a rope force S. Lifting means according to the present invention include ropes, chains, belts and the like. A pendulum angle a with its Cartesian components $a_x$, $a_y$ is illustrated between the lifting means 10 and the vertical axis v. The angle component $a_x$ is, for example, the pendulum angle in a crane motion direction, and the angle component $a_y$ is the pendulum angle in the hoist trolley motion direction. The determination of these two angle components $a_x$ and $a_y$ is determined by the signal processing device from the force-proportional measurement signals of the force transducers 1.

It will be understood that each of the elements described above, or two or more together, may also find a useful application in other types of measurement devices differing from the types described above.

While the invention has been illustrated and described as embodied in the context of a measurement system and measurement method at a lifting means, in particular at a loaded lifting rope for hoisting devices, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A measurement device at a lifting means, in particular including a lifting rope subjected to load for hoisting machines comprising a support element;

a first support hinge attached to the support element;

a first force transducer attached by the first support hinge to the support element and having a first free end;

a second support hinge attached to the support element;

a second force transducer attached by the second support hinge at the support element and having a second free end;

a common hinge having an axis disposed perpendicular to a plane spanned by the first support element and by the second support element for joining together the first free end of the first force transducer and the second free end of the second force transducer;

lifting means connecting at the common hinge;

a signal processing device connected to the first force transducer and to the second force transducer for transducing respective force-proportional measurement signals.

2. The measurement device according to claim 1, wherein the second hinge is disposed about parallel to the first support hinge and wherein
the common hinge is disposed substantially parallel to the first support hinge and to the second support hinge and is disposed outside of a plane connecting the first support hinge to the second support hinge on the side of the load position.

3. The measurement device according to claim 1, wherein a first distance from the first support hinge to an axis (v), running vertically through a pivot center point (M) of the common hinge, is equal to a distance from the second support hinge to the axis (v), running vertically through the pivot center point (M) of the common hinge.

4. The measurement device according to claim 3, wherein
the first distance and the second distance are selected such that the angles (b), enclosed by the vertical axis (v), and a respective straight line (g), running through a respective support hinge and the common hinge, amount to substantially 30°.

5. The measurement device according to claim 4, wherein the first support hinge of the first force transducer and the second support hinge of the second force transducer are disposed in a horizontal plane.

6. The measurement device according to claim 5, wherein
the first support hinge and the second support hinge are uniformly distributed on an imaginary circle running concentrically to the axis of the common hinge.

7. The measurement device according to claim 1, further comprising
a third support hinge;
a third force transducer hinged at the third support hinge for a total of three force transducers, and wherein the first support hinge of the first force transducer and the second support hinge of the second force transducer are disposed in the corner points of an imaginary pyramid with an equal-sided triangular base face.

8. The measurement device according to claim 1 further comprising
a first connection hinge disposed at a first end of a first connection body;
a second connection hinge disposed at a second end of a second connection body;
a common connection body carrying the common hinge wherein the first force transducer with its first end and the second force transducer with its second end, are disposed remote relative to the support element at the common connection body via the first connection hinge and the second connection hinge, and wherein the first connection body receives the first connection hinge on the side disposed opposite to the first force transducer, and wherein the second connection body receives the second connection hinge on the side disposed opposite to the second force transducer.

9. The measurement device according to claim 1, wherein the first force transducer and the second force transducer are furnished as tension dynamometer rods with wire strain gauges.

10. A measurement device at a lifting means, in particular including a lifting rope subjected to load for hoisting machines comprising
a support element;
a first support hinge attached to the support element;
a first force transducer attached by the first support hinge to the support element and having a first free end;
a second support hinge attached to the support element;
a second force transducer attached by the second support hinge at the support element and having a second free end;
a common hinge for joining together the first free end of the first force transducer and the second free end of the second force transducer;
lifting means connecting at the common hinge; a signal processing device connected to the first force transducer and to the second force transducer for transducing respective force-proportional measurement signals,
wherein
the signal processing device includes
an electronic amplifier connected to one of the force transducers for amplifying force-proportional measurement signals; a scanning and holding circuit connected to the electronic amplifier for receiving and storing amplified measurement signals and outputting clocked measurement signals;
an analog digital converter connected to the scanning and holding circuit for transforming the clocked measurement signals into digital signals;
a computer unit connected to the analog digital converter for determining as desired a pendulum angle, a rope force, and a gravity weight force from the digital measurement signals.

11. A measurement device at a lifting means, in particular including lifting rope subjected to load for hoisting machines, wherein
at least two force transducers (1) are attached via in each case a support hinge (4) at a support element (5), wherein each support hinge has a hinge axis, wherein the two force transducers (1) span a plane disposed perpendicular to each hinge axis, and wherein the free ends (3) of the force transducers (1) are joined together via a common hinge (9), wherein the lifting means (10) connects at the hinge (9), and wherein the force transducers (1) are connected to a signal processing device (12-15) for transmission of a force-proportional measurement signal.

12. The measurement device according to claim 11, wherein
the hinge (9) is disposed in load direction outside of a plane connecting the support hinges (4).

13. The measurement device according to claim 11, wherein the distances (c) between the support hinges (4) and an axis (v), running vertically through the pivot center point (M) of the hinge (9), are equal;
wherein
the distances (c) are selected such that the angles (b), enclosed by the vertical axis (v), and the straight line (g), running through the support hinges (4) and the hinge (9), amount of 30°;
the support hinges (4) of the force transducers (1) are disposed in a horizontal plane;
wherein the support hinges (4) are uniformly distributed on an imaginary circle running concentrically to the axis (v).

14. The measurement device according to claim 11, wherein
three force transducers (1) are furnished, and wherein the support hinges (4, 9) of the force transducers (1) are disposed in the corner points of an imaginary pyramid with an equal-sided triangular base face.

15. The measurement device according to claim 11, wherein
the force transducers (1) are disposed with their ends (3), remote relative to the support element (5), at a connection body (8) via connection hinges (1), and wherein the connection body (8) receives the hinges (9) on the side disposed opposite to the force transducer (1); and wherein the force transducers (1) are furnished as tension dynamometer rods with wire strain gauges.

16. A measurement device at a lifting means, in particular including a lifting rope subjected to load for hoisting machines, wherein
at least two force transducers (1) are attached via in each case a support hinge (4) at a support element (5) disposed at a lifting device, and wherein the free ends (3) of the force transducers (1) are joined together via a common hinge (9), wherein the lifting means (10) connects at the hinge (9), and wherein the force transducers (1) are connected to a signal processing device (12–15) for transmission of a force-proportional measurement signal, wherein
the signal processing device (12–15) includes at least one electronic amplifier (12), amplifying the force-proportional measurement signal, a scanning and holding circuit (13) for storing the amplified measurement signal and outputting clocked measurement signals, an analog digital converter (15), transforming the clocked measurement signals, and a computer unit (14) determining from digital measurement signals a pendulum angle, as well as possibly a rope force, and a gravity weight force.

17. A measurement method, using a measurement device at a lifting means, in particular including a lifting rope, subjected to load for hoisting machines, wherein at least two force transducers (1) are attached via in each case a support hinge (4) at a support element (5), wherein free ends (3) of the force transducers (1) are joined together via a common hinge (9), wherein the lifting means (10) connects at the hinge (9), and wherein the force transducers (1) are connected to signal processing means (12–15) for transmission of force-proportional measurement signals, wherein a rope force present at the support element (5) and engaging at the support hinge (4) is measured by at least two force transducers (1), and wherein a pendulum angle (a) of the lifting means (10), as well as possibly the rope force (S), and a gravity weight force (F), are determined by the signal processing means (12–15) from the force-proportional measurement signals of the force transducers (1) and from the fixed geometric disposition of the force transducers (1) relative to each other; wherein
the signal processing means (12–15) amplifies the signals received from the force transducers (1), wherein the amplified measurement signals are intermediately stored by a scanning and holding unit (13), and wherein the amplified and clocked measurement signals are fed to an analog digital converter (15), wherein the transmitted measurement signals are transformed by the analog digital converter (15), and wherein the digitally converted measurement signals are fed to a computer unit (14) for determining the pendulum angle (a) as well as possibly the rope force (S) and the gravity weight force (F).

18. The measurement method according to claim 17, further comprising
employing the measurement device as a measurement value transducer for a pendulum balancing control system in automatic crane machines.

19. A measurement method, using a measurement device at a lifting means, in particular including a lifting rope, subjected to load, for hoisting machines, using the following measurement device comprising
a first support hinge attached to the support element;
a first force transducer attached by the first support hinge to the support element and having a first free end;
a second support hinge attached to the support element;
a second force transducer attached by the second support hinge at the support element and having a second free end; a common hinge for joining together the first free end of the first force transducer and the second free end of the second force transducer;
lifting means connecting at the common hinge;
a signal processing device connected to the first force transducer and to the second force transducer for transducing respective force-proportional measurement signals,
comprising the steps
engaging the second support hinge with the second force transducer;
measuring a rope force (S) present at the support element with at least two force transducers;
generating force-proportional measurement signals in the force transducers;
feeding the force-proportional measurement signals to signal processing means;
determining a pendulum angle (a) of the lifting means, a rope force (S), and a gravity weight force (F) as desired with the signal processing means from the force-proportional measurement signals derived from the force transducers and from a fixed geometric disposition of the force transducers relative to each other.

20. The method according to claim 19 further comprising
amplifying the signals received from the force transducers in the signal processing means;
intermediately storing amplified measurement signals in a scanning and holding unit;
feeding the amplified and clocked measurement signals to an analog digital converter;
transforming the transmitted measurement signals in the analog digital converter into digital signals;
and feeding the digital measurement signals to a computer unit for determining the pendulum angle (a), the rope force (S) and the gravity weight force (F) as desired.

21. The method according to claim 19 further comprising
employing the measurement device as a measurement value transducer for a pendulum balancing control system in an automatic crane operation.

22. A measurement device at a lifting means, in particular including a lifting rope subjected to load for hoisting machines comprising a support element;

a first support hinge attached to the support element;

a first force transducer attached by the first support hinge to the support element and having a first free end;

a second support hinge attached to the support element;

a second force transducer attached by the second support hinge at the support element and having a second free end;

a common hinge for joining together the first free end of the first force transducer and the second free end of the second force transducer;

lifting means connected at the common hinge;

a signal processing device connected to the first force transducer and to the second force transducer for transducing respective force-proportional measurement signals.

a scanning and holding circuit connected to the electronic transducer for receiving and storing measurement signals and for outputting clocked measurement signals.

23. The measurement device according to claim 22 further comprising an analog digital converter connected to the scanning and holding circuit for transforming the clocked measurement signals into digital signals;

a computer unit connected to the analog digital converter for determining as desired a pendulum angle, a rope force, and a gravity weight force from the digital measurement signals.

24. The measurement device according to claim 22 further comprising an electronic amplifier connected to one of the force transducers for amplifying the force-proportional measurement signals.

25. The measurement device according to claim 22, wherein the second hinge is disposed about parallel to the first support hinge and wherein the common hinge is disposed substantially parallel to the first support hinge and to the second support hinge and is disposed outside of a plane connecting the first support hinge to the second support hinge on the side of the load position.

26. The measurement device according to claim 22, wherein a first distance from the first support hinge to an axis (v), running vertically through a pivot center point (M) of the common hinge, is equal to a distance from the second support hinge to the axis (v), running vertically through the pivot center point (M) of the common hinge.

27. The measurement device according to claim 26, wherein the first distance and the second distance are selected such that the angles (b), enclosed by the vertical axis (v), and a respective straight line (g), running through a respective support hinge and the common hinge, amount to substantially 30°.

28. The measurement device according to claim 27, wherein the first support hinge of the first force transducer and the second support hinge of the second force transducer are disposed in a horizontal plane.

29. The measurement device according to claim 28, wherein the first support hinge and the second support hinge are uniformly distributed on an imaginary circle running concentrically to the axis of the common hinge.

30. The measurement device according to claim 22, further comprising a third support hinge;

a third force transducer hinged at the third support hinge for a total of three force transducers, and wherein the first support hinge of the first force transducer and the second support hinge of the second force transducer are disposed in the corner points of an imaginary pyramid with an equal-sided triangular base face.

31. The measurement device according to claim 22 further comprising a first connecting hinge disposed at a first end of a first connecting body;

a second connection hinge disposed at a second end of a second connection body;

a common connection body carrying the common hinge wherein the first force transducer with its first end and the second force transducer with its second end, are disposed remote relative to the support element at the common connection body via the first connecting hinge and the second connection hinge, and wherein the first connection body receives the first connection hinge on the side disposed opposite to the first force transducer, and wherein the second connection body receives the second connection hinge on the side disposed opposite to the second force transducer.

32. The measurement device according to claim 22, wherein the first force transducer and the second force transducer are furnished as tension dynamometer rods with wire strain gauges.

33. A measurement device at a lifting means, in particular including a lifting rope subjected to load for hoisting machines comprising a support element;

a first support hinge attached to the support element;

a first force transducer attached by the first support hinge to the support element and having a first free end;

a second support hinge attached to the support element;

a second force transducer attached by the second support hinge at the support element and having a second free end;

a common hinge for joining together the first free end of the first force transducer and the second free end of the second force transducer;

lifting means connected at the common hinge;

a signal processing device connected to the first force transducer and to the second force transducer for transducing respective force-proportional measurement signals;

a computer unit connected to the signal processing means for determining as desired a pendulum angle, a rope force, and a gravity weight force from the measurement signals.

34. The measurement device according to claim 33 further comprising an electronic amplifier connected to one of the force transducers for amplifying force-proportional measurement signals;

a scanning and holding circuit connected to the electronic amplifier for receiving and storing amplified measurement signals and for outputting clocked measurement signals;

an analog digital converter connected to the scanning and holding circuit for transforming the clocked measurement signals into digital signals to be delivered to the computer unit.

35. The measurement device according to claim 33, wherein the second hinge is disposed about parallel to the first support hinge and wherein the common hinge is disposed substantially parallel to the first support hinge and to the second support hinge and is disposed outside of a plane connecting the first support hinge to the second support hinge on the side of the load position.

36. The measurement device according to claim 33, wherein a first distance from the first support hinge to an axis (v), running vertically through a pivot center point (M) of the common hinge, is equal to a distance from the second support hinge to the axis (v), running vertically through the pivot center point (M) of the common hinge.

37. The measurement device according to claim 36, wherein the first distance and the second distance are selected such that the angles (b), enclosed by the vertical axis (v), and a respective straight line (g), running through a respective support hinge and the common hinge, amount to substantially 30°.

38. The measurement device according to claim 37, wherein the first support hinge of the first force transducer and the second support hinge of the second force transducer are disposed in a horizontal plane.

39. The measurement device according to claim 38, wherein the first support hinge and the second support hinge are uniformly distributed on an imaginary circle running concentrically to the axis of the common hinge.

40. The measurement device according to claim 33, further comprising a third support hinge;

a third force transducer hinged at the third support hinge for a total of three force transducers, and wherein the first support hinge of the first force transducer and the second support hinge of the second force transducer are disposed in the corner points of an imaginary pyramid with an equal-sided triangular base face.

41. The measurement device according to claim 33 further comprising a first connection hinge disposed at a first end of a first connection body;

a second connection hinge disposed at a second end of a second connection body;

a common connection body carrying the common hinge wherein the first force transducer with its first end and the second force transducer with its second end, are disposed remote relative to the support element at the common connection body via the first connection hinge and the second connection hinge, and wherein the first connection body receives the first connection hinge on the side disposed opposite to the first force transducer, and wherein the second connection body receives the second connection hinge on the side disposed opposite to the second force transducer.

42. The measurement device according to claim 33, wherein the first force transducer and the second force transducer are furnished as tension dynamometer rods with wire strain gauges.

* * * * *